United States Patent [19]

Gordon et al.

[11] Patent Number: 4,528,449

[45] Date of Patent: Jul. 9, 1985

[54] DETECTOR DEWAR ASSEMBLY

[75] Inventors: William R. Gordon, Burlington; Peter N. Nicholson, Methuen, both of Mass.

[73] Assignee: Honeywell Inc., Minneapolis, Minn.

[21] Appl. No.: 453,566

[22] Filed: Dec. 27, 1982

[51] Int. Cl.³ .............................................. G01J 1/00
[52] U.S. Cl. ..................................... 250/352; 250/349
[58] Field of Search ................................ 250/352, 385

[56] References Cited

U.S. PATENT DOCUMENTS

| | | | |
|---|---|---|---|
| 3,259,865 | 7/1966 | Lederhandler et al. | 250/352 |
| 3,851,173 | 11/1974 | Taylor et al. | 250/352 |
| 4,029,893 | 6/1977 | Roger | 174/15 CA |
| 4,161,655 | 7/1979 | Cotic et al. | 250/385 |
| 4,206,354 | 6/1980 | Small | 250/352 |
| 4,297,576 | 10/1981 | Laval et al. | 250/385 |

FOREIGN PATENT DOCUMENTS 3130287 7/1981 Fed. Rep. of Germany.

*Primary Examiner*—Alfred E. Smith
*Assistant Examiner*—R. Hanig
*Attorney, Agent, or Firm*—John S. Solakian; Laurence J. Marhoefer

[57] ABSTRACT

An improved detector dewar assembly comprised primarily of metal subassemblies, which is easily assembled, and leaves the included detector assembly more readily serviceable.

16 Claims, 4 Drawing Figures

DETECTOR DEWAR ASSEMBLY

BACKGROUND OF THE INVENTION

The device of the present invention relates to thermal imaging systems, and, more particularly, to detector dewar assemblies used in such systems.

In most thermal imaging systems using semiconductor detection devices which must be cryogenically cooled, it is necessary to provide a housing (or "dewar") for the detector device. The dewar must be evacuated and provide electrical connections between the detector device and the housing between the detector array and the housing exterior so that the device may be interfaced to other signal processing or imaging subassemblies.

Typically, these dewars include several concentric cylindrical tubes or housings. The inner tube is generally comprised of a long cylindrical glass bore which opens to the base of the dewar. This bore, often referred to as the "coldwell", is multifunctional. First, the detector device or array is mounted at the top of the coldwell (the "endwell"). A "cold finger" or cryogenic cooling device is generally inserted into the bore of the coldwell to effect cooling of the detector array. Often the exterior surfaces of the coldwell are metalized and then etched or delineated in order to define conductive leads which run the length of the bore.

Past dewars have used a gold plated glass bore to provide a thermally reflective shield and reduce heat load. In addition, glass has been used because it has the advantage that it is a good electrical and thermal insulator, it is not ductile and once fixed in the system, alignment will remain true unless the bore breaks. However, the glass coldwell has the disadvantage that it is extremely fragile and requires more complex and expensive assembly techniques.

In prior art dewars, the base portion of the coldwell supports a flange to which a cap is attached. This cap is typically made of Kovar or some other metal which has appropriate structural and thermal properties and can maintain a hard vacuum. The top part of the cap directly above the detector array holds a small, transmissive window.

In one type of dewar, this flange comprises a ceramic material. The horizontal ceramic substrate receives wire connectors from the vertical glass coldwell (jumper wires). The ceramic conductor pattern (usually radial) connects through the vacuum wall to conventional pin connectors outside the vacuum portion of the dewar. Thus, the detector leads can be connected to external imaging or signal processing subassemblies.

In a second dewar design, a metal flange, bonded appropriately to the glass coldwell, serves primarily as a supporting member for the vacuum chamber cap and window. The base portion of the glass coldwell is thickened so that it may include buried conductive wires which surface above and below the flange providing an electrical exit from the vacuum chamber. Gold jumper wires are used to connect the axial leads on the coldwell to the detector array and to surfaced conductors on the coldwell above the flange. The conductors surfacing below the flange (outside the vacuum) may be connected to a conventional tape cable or other wiring device.

In either design a second larger flange is connected to the coldwell at its base. This flange supports an outer protective housing which encloses the vacuum chamber, as well as supporting the mounting flange for the dewar. The housing has openings for the end of the vacuum cap with transmissive window, and for electrical connectors. In either design, a tape cable or other wiring device connects from the vacuum exit conductors to standard electrical interconnects.

These prior designs have several disadvantages. First, to repair the detector array or other connections within the vacuum chamber the entire device must be disassembled; the outer housing removed, wire cable detached, and the vacuum cap removed. Second, since the coldwell is made of glass, the device is particularly susceptible to breakage during assembly, disassembly, and normal use. Third, the gold jumper wire connectors used at the array and flange or the buried lead connections are susceptible to breakage. Fourth, the volume of the vacuum chamber is usually a small percentage of that of the finished assembly, such that when impurities from the materials outgas into the vacuum chamber, the vacuum degrades at a high rate. Finally, because the design uses many parts and requires use of more complex assembly techniques, the cost per unit is usually high.

Accordingly, it is a primary object of the present invention to provide an improved detector dewar assembly.

SUMMARY OF THE INVENTION

These and other objects of the present invention are achieved by providing a dewar vessel which may have a metal coldwell, a single vessel/vacuum chamber, internal tape cable(s) and hermetically sealed pin connector(s) to affect connection between the detector array and external signal processing devices.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENTS

Figure 1A:
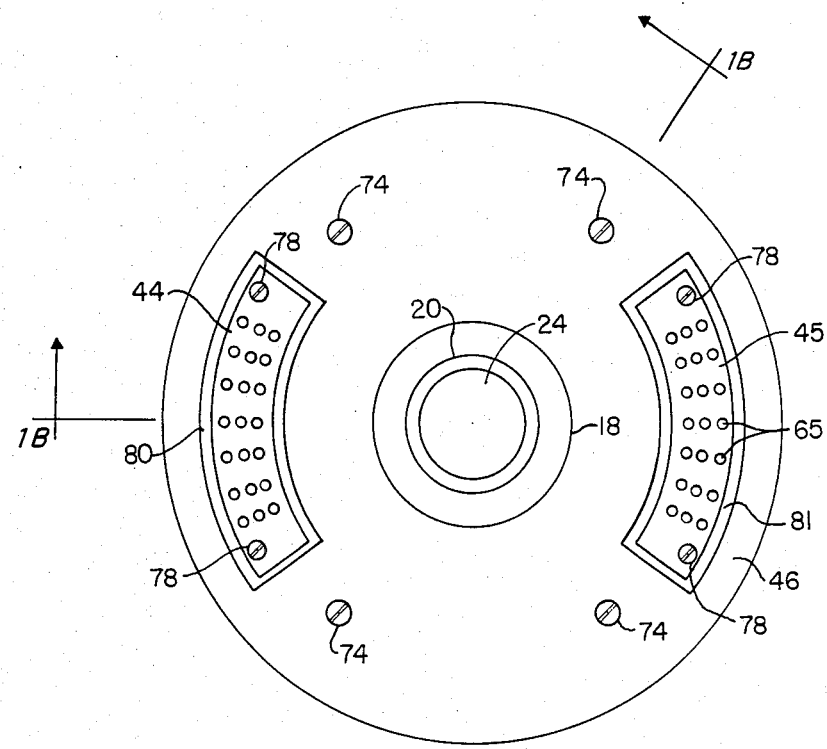
FIGS. 1A and 1B show a top view and a cross-section through the device of the present invention, respectively.
Figure 1B:
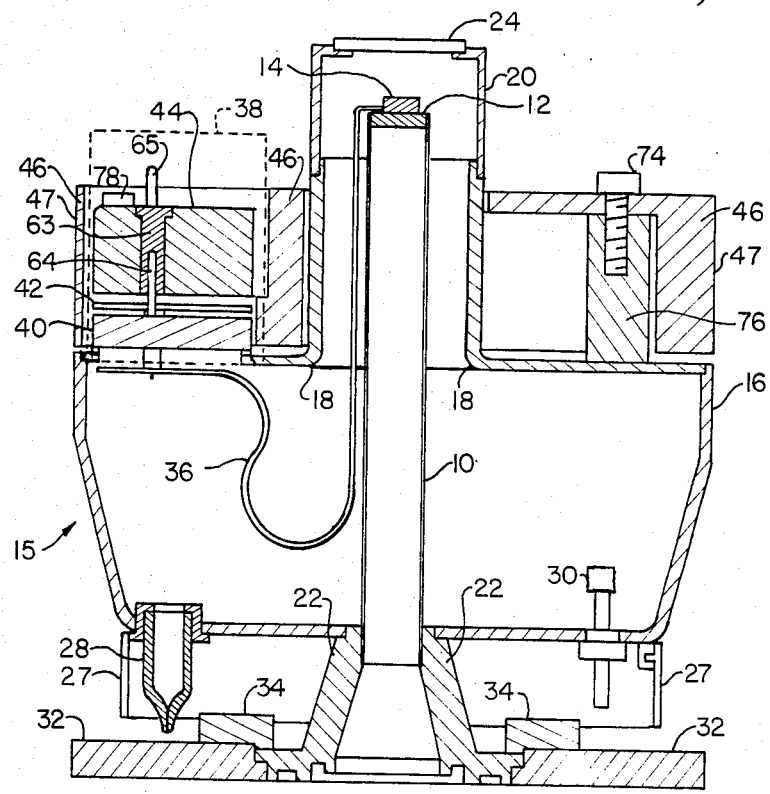

Referring to FIGS. 1A and 1B, the apparatus of the present invention includes a metal coldwell 10 with endwell 12 which supports detector assembly 14; a vacuum vessel 15 having a base 22, flange/wall member 16, protective shield ring 27, lower cap 18 and upper cap 20 with transmissive window 24. A flexible tape cable 36 provides electrical connection between detector assembly 14 and external pin connector assembly 38. Connector holder assembly or plate 46 provides a strain free mounting configuration for pin connector 38. A conventional pinch-off tube 28 (used for evacuating the dewar) and "getter" 30 (which absorbs outgassed materials within the evacuated chamber) are mounted through flange/wall member 16 in a conventional manner.

Base 22 and other vacuum chamber members 10, 12, 16, 18, 20 and 24 described above, may be made of any material which is mechanically rigid, has appropriate thermal properties, can hold a vacuum and does not outgas impurities at an unacceptable rate, once evacuated. Typically, these members will be made of stainless steel, Kovar or some other metal which may be easily assembled by, for example, soldering, welding or brazing techniques. Similarly, shield ring 27 might be made of any mechanically durable and formable material, such as plastic or stainless steel. Upper cap 20 is attached to lower cap 18 by soldering. Upper cap 20 may be easily removed to provide direct access to detector assembly 14 as well as elements 12, 10 and 36.

Coldwell 10 may be made of any material which is easily assembled to base 22 and which has low thermal conductivity, and high mechanical strength. As an example, metal such as a cobalt/nickel/iron alloy might be used. Coldwell 10 wall thickness may be reduced to minimize thermal conductivity. In addition, the external surface of coldwell 10 may be gold plated to provide a thermally reflective surface to lower the overall heat load of the dewar.

Figure 2:
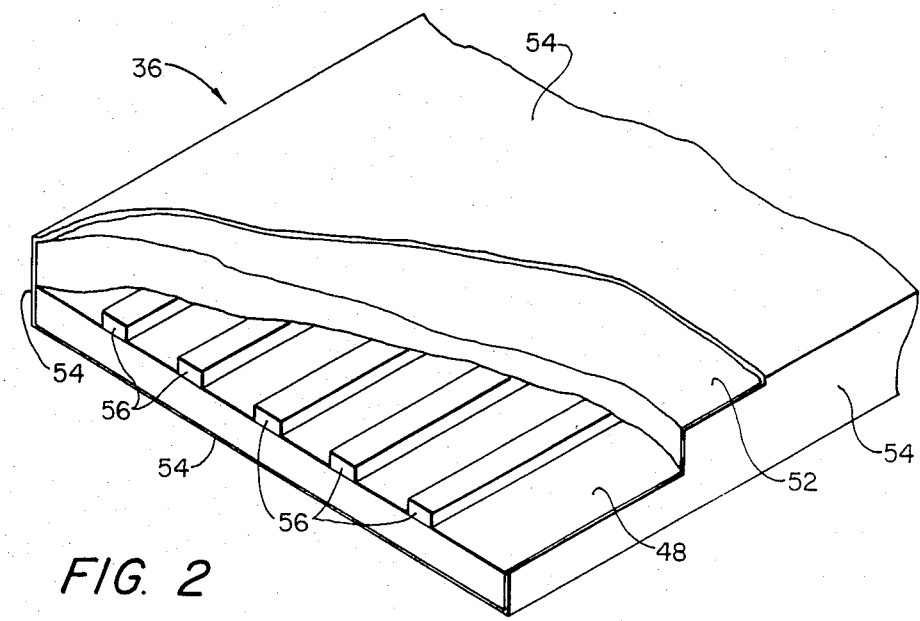
FIG. 2 shows the tape cable apparatus of the present invention.

The flexible tape cable 36 provides electrical connection between detector assembly 14 and external pin connector assembly 38. As shown in FIG. 2, the tape cable 36 of the present invention comprises a flexible nonconductive base 48 upon which conductive tracks 56 have been electrodeposited. A second flexible nonconductive sheath 52 covers tracks 56. The external surface of the cable 36 may be coated with gold to form a new outer surface 54. This provides a further reduction of the heat load of the apparatus. Base 48 and sheath 52 may be made of Kapton, mylar or any other suitable nonconductive material which will not outgas into the evacuated dewar. Tracks 56 might be made of copper, gold or some other suitable conductive material which may be electrodeposited to base 48. Such materials should not be glued because of impurities therein.

Figure 3:
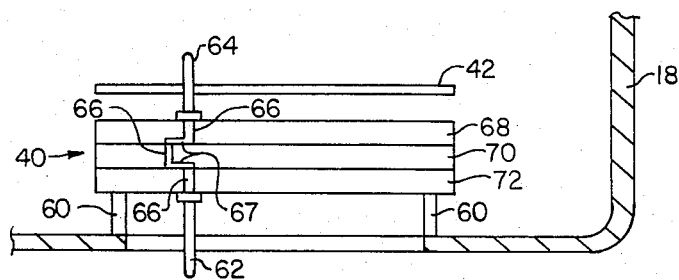
FIG. 3 illustrates an electrical feed through subassembly of the apparatus of the present invention.

Referring to FIGS. 1A, 1B and 3, pin connector saver assembly 38 comprises feed through assembly 40, bias resistor board 42 and connector saver 44. Feed through assembly 40 is made of a ceramic or other insulating material capable of holding a hard vacuum. Assembly 40 is attached to ring 60 which is integral with lower cap 18. Feed through assembly 40 comprises multiple layers 68, 70, 72 of material which has been attached as shown in FIG. 3. Electrical connection is made through assembly 40 from pins 62 to pins 64 by a combination of vias 66 and conductor tracks 67 made through and across the surfaces of layers 68, 70 and 72 as shown. It is noted that only one representative pin connection of the several connector pins of connectors 44 and 45 is shown.

This configuration provides several advantages. First, it assures the vacuum integrity of the assembly by eliminating straight through pin connection. Second, if necessary, a cross-over assembly may be provided by appropriate arrangement of tracks 67 and vias 66 which allow reordering of the configuration of pin connectors 62 from the tape cable 36 to a desired pattern of pin connectors 64 on the feed through assembly 40. This allows mating with external device connectors via connector saver 44 in a predetermined pattern of electrical connections.

A bias resistor board 42 may be inserted between feed through assembly 40 and connector saver 44 to provide a tailored electrical resistance in each detecting element's circuit, together with grounds as required.

To prevent stress on the feed through assembly 40 which might result in breakage or vacuum leaks, a connector saver plate 46 is used to isolate stresses applied during attachment or detachment of any external connectors to connector saver 44. This bracket 46 includes a single shaped disk having recessed wells 80 and 81 whose location is matched to the location of feed through assemblies 40 on lower cap 18. Connector saver 44 is mounted into well 80 via fasteners 78. Bracket 46 is mounted via fasteners 74 to bosses, i.e., stand-offs, 76 which provide a mounting surface. Bosses 76 may be brazed to lower cap 18. The height of bosses 76 is such that when the bracket 46 is in position with connector saver 44, pins 64 mate to receptacles 63 in connector saver 44 without contact between connector saver 44 and feed through assembly 40. In addition, connector saver bracket 46 is designed to provide a shielding cylindrical external surface 47, which protects the connector assembly 38 and the top of the vessel 15 from damage.

It should also be noted that pinch-off tube 28 and getter 30 might be positioned elsewhere on vessel 15 to increase accessibility, for example on lower cap 18. In that embodiment, any necessary electrical connection of getter 30 might be made via electrical connection to the fasteners 78 which are a part of connector saver 44.

Having described the invention, what is claimed as new and novel and for which it is desired to obtain Letters Patent is:

1. Detector dewar apparatus for housing an electromagnetic radiation detector assembly in a vacuum, said apparatus providing a means for electrical connection between detector elements of said radiation detector assembly and other signal processing subassemblies external to said apparatus, said apparatus comprising:
   A. an inner container having an end surface at a first end of said inner container;
   B. an outer container;
   C. means for mounting said inner container in said outer container;
   D. detector means mounted on said end surface;
   E. connector means mounted on said outer container, said connector means providing a plurality of electrical connections from the inside of said outer container to the outside of said outer container while still providing a seal to prevent any significant change in the vacuum which may be contained within said inner and outer containers;
   F. electrical connection means for coupling said detector means to said connector means, said electrical connection means located in the space between said inner container and said outer container; and
   G. stress relief means comprising
      i. at least two stand-offs secured to the outer surface of said outer container near said connector means,
      ii. a stress relief connector, and
      iii. a stress relief plate having means for securing said stress relief connector, said plate mounted on said stand-offs and wherein said plate is positioned such that it does not contact said outer surface of said outer container and such that it does not contact said connector means, except for the engagement of electrical terminals included in both said connector means and said stress relief connector.

2. Apparatus as in claim 1 wherein said connector means includes:
   A. at least three insulating layers including first and second outer layers and an inner layer;

B. a plurality of outer terminals mounted on said first outer layer of said insulating layers;

C. a plurality of inner terminals mounted on said second outer layer of said insulating layers; and D. second electrical connection means coupled between each of said outer terminals and said inner terminals respectively in a physical path which runs from said inner terminal through said second outer layer, along the junction of said second outer layer and said inner layer, through said inner layer, along the junction of said inner layer and said first outer layer, and then through said first outer layer to said outer terminal.

3. Apparatus as in claim 2 wherein said electrical connection means is a cable.

4. Apparatus as in claim 3 wherein said cable is flexible.

5. Apparatus as in claim 3 wherein said cable comprises conductor tracks electrodeposited on a nonconducting substrate.

6. Apparatus as in claim 5 wherein said cable is coated with material in order to help minimize cooling requirements of said apparatus.

7. Apparatus as in claim 6 wherein said material includes gold.

8. Apparatus as in claim 2 wherein said inner container is made from a metallic material.

9. Apparatus as in claim 8 wherein said metallic material may be a cobalt/nickel/iron alloy.

10. Apparatus as in claim 2 wherein said outer container includes a cap which is located in a position near said first end of said inner container, said cap detachable from said outer container in order to provide access to said detector means.

11. Apparatus as in claim 10 wherein said cap includes a transmissive window positioned such that said detector means may receive radiation from outside of said apparatus.

12. Apparatus as in claim 1 wherein said connector means includes a plurality of inner and outer terminals and further comprises means for connecting each of said inner terminals to each of said outer terminals, respectively, by means of an electrical path which inhibits vacuum degradation of said apparatus.

13. Apparatus as in claim 12 wherein said electrical path is physically made with at least one change in physical direction.

14. Apparatus as in claim 2 wherein the physical location of connected inner and outer terminals may be located in different positions in order to facilitate differences in electrical connection of said internal electrical connection means and external cable devices which may be coupled to signal processing equipment.

15. Detector dewar apparatus for housing an electromagnetic radiation detector assembly in a vacuum, said apparatus providing a means for electrical connection between detector elements of said radiation detector assembly and other signal processing subassemblies external to said apparatus, said apparatus comprising:

A. an inner container having an end surface at a first end of said inner container;

B. an outer container;

C. means for mounting said inner container in said outer container;

D. detector means mounted on said end surface;

E. connector means mounted on said outer container, said connector means providing a plurality of electrical connections from the inside of said outer container to the outside of said outer container while still providing a seal to prevent any significant change in the vacuum which may be contained within said inner and outer containers, said connector means comprising
  i. at least three insulating layers including first and second outer layers and an inner layer,
  ii. a plurality of outer terminals mounted on said first outer layer of said insulating layers,
  iii. a plurality of inner terminals mounted on said second outer layer of said insulating layers,
  iv. second electrical connection means coupled between each of said outer terminals and said inner terminals respectively in a physical path which runs from said inner terminal through said second outer layer, along the junction of said second outer layer and said inner layer, through said inner layer, along the junction of said inner layer and said first outer layer, and then through said first outer layer to said outer terminal; and F. electrical connection means for coupling said detector means to said connector means, said electrical connection means located in the space between said inner container and said outer container.

16. Apparatus as in claim 15 further comprising:

A. at least two stand-offs secured to the outer surface of said outer container near said connector means;

B. a stress relief connector; and

C. a stress relief plate having means for securing said stress relief connector, said plate mounted on said stand-offs and wherein said plate is positioned such that it does not contact said outer surface of said outer container and such that said stress relief connector does not contact said connector means, except for the engagement of electrical terminals included in both said connector means and said stress relief connector.

* * * * *